May 28, 1935.　　　J. C. CROWLEY　　　2,003,039

AIR CHUCK

Filed Nov. 10, 1931

Inventor
JOHN C. CROWLEY.
Kwis Hudson & Kent
attys.

Patented May 28, 1935

2,003,039

UNITED STATES PATENT OFFICE 2,003,039

AIR CHUCK

John C. Crowley, Cleveland Heights, Ohio, assignor to The Dill Manufacturing Company, Cleveland, Ohio, a corporation of Ohio Application November 10, 1931, Serial No. 574,103

4 Claims. (Cl. 284—17)

This invention relates to an air chuck and particularly to an air chuck adapted to be secured to an air hose and provided with means for maintaining the chuck, when applied to a valve stem, such as the valve stem of a pneumatic tire, in the proper connecting position on the stem.

An object of the invention is to provide, in an air chuck, means for maintaining the chuck in position upon a valve stem with the proper airtight connection therebetween which is of simple construction, permits the ready application and removal of the chuck to and from the valve stem, efficiently maintains the chuck in position upon the stem, can be readily adapted for use with different forms of air chucks, and is so constructed as to possess durability.

A further and more specific object is to provide means in an air chuck, such as specified in the object above mentioned, which means includes a segmental portion adapted to engage the threads of a valve stem and normally held in thread engaging position but removable from such position while the chuck is being applied to and removed from the valve stem.

Another object is to provide means in an air chuck, such as specified in the last mentioned object, wherein the segmental thread engaging portion is located so as to engage the threads of the valve stem adjacent that side of the chuck opposite the side from which the air hose extends.

Additional and further objects of the invention will become apparent hereinafter during the following detailed description of an embodiment thereof.

Referring now to the drawing illustrating the said embodiment of the invention,

It should be understood at the outset that the present invention might be used upon differently constructed air chucks and, in fact, is particularly adapted to that end. Therefore, the particular form of air chuck illustrated herein is only by way of example and merely forms part of the present invention insofar as certain of its members cooperate with the means for maintaining the chuck in position upon valve stems.

Figure 1:
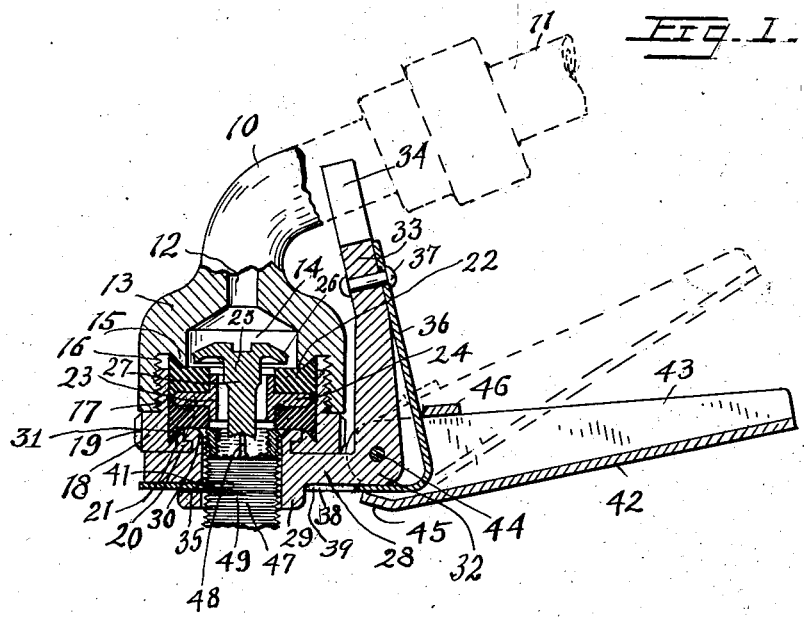
Figure 1 shows an air chuck provided with the invention and applied to a valve stem, a portion of this view being in section and the remainder in elevation.

Referring to the drawing and particularly to Fig. 1, the chuck will be seen to comprise a portion 10, preferably angular as shown, to facilitate the application of the chuck to a valve stem, which portion 10 is connected to an air hose 11, in any desired manner, and is provided with a bore 12 for conducting the air from the hose 11 into the head 13 of the chuck. The head 13 is provided with a chamber 14 communicating with the bore 12, which chamber is formed of a pair of counterbores of different diameter, the outer of which is substantially larger than the inner. An internal flange 15 is arranged at the junction of the two counterbores forming the chamber 14 and is provided with an outwardly extending pointed annular rib, the outer circumferential side of which is inclined, as shown. The larger counterbore of the two counterbores forming the chamber 14 is threaded, as indicated at 16, to enable the threaded sleeve portion 17 of a nut 18 to be screwed into the head.

The nut 18 is provided with an annular shoulder-like portion, the exterior surface of which is knurled, as indicated at 19, to facilitate the assembly of the nut in the head and forming, when the nut is so assembled, substantially a continuation of the outer side of the head. The nut 18 is further provided at its outer end with an inwardly extending annular flange 20, from the upper surface of which projects inwardly of the nut a pointed annular rib 21, similar to the pointed rib on the flange 15.

A flexible washer or gasket 22 having a central opening is arranged in the nut and has oppositely extending V-shaped ribs upon each of its circumferential edges, the outer of said ribs being arranged to extend into the space between the rib 21 and the wall of the nut. A sleeve 23 is positioned in the central opening in the washer 22 and has an outwardly extending pointed annular flange 24 intermediate its ends and adapted to bear upon the inner side of the washer 22. A second washer 22 is arranged upon the sleeve 23 so as to engage the opposite side of the flange 24 from that engaged by the first mentioned washer 22, it being noted that the inner V-shaped rib of this last mentioned washer has a complemental fit with the rib formed on the flange 15, while the adjacent V-shaped ribs of both washers 22 have a complemental fit with the pointed flange 24.

It will be noted that when the nut 18 is screwed into the head 13 that the washers 22 will be firmly compressed and will provide an airtight seal between the nut and the head, thus leaving the alined openings through the washers, the passage through the sleeve, and the bore of the nut 18 as the only air passage from the chamber 14 through the chuck.

The chuck is provided with a valve 25 having a head located inwardly of the innermost gasket or washer 22 and provided with an outwardly and downwardly extending flange 26 forming on its under side a knife-like edge adapted to seat upon the inner gasket 22 to stop the passage of air through the chuck, as is well understood. Projecting from the head of the valve is a valve pin 27 provided with diametrically disposed flats, as is well understood in the art.

The means for positioning the chuck upon a valve stem includes an annular member 28 having a central opening therethrough alining with the opening in the nut 18 and provided at the ends of said opening with tubular extensions 29 and 30. The extension 30 is preferably of less thickness than the extension 29 and has its outer end turned outwardly, as indicated at 31, to fit over the flange 20 of the nut 18 and to provide a swivel connection between said nut and the member 28, wherefore, the nut and member 28 may be assembled as a unit upon the air chuck, it being appreciated, of course, that the member 28 is not turned during such assembly.

Extending outwardly and upwardly from the circumferential edge of the member 28 and at the right hand side thereof, as viewed in the drawing, is a substantially L-shaped arm 32, the upper portion of which is angularly disposed, as indicated at 33, and takes at its outer end the form of a U-shaped fork 34 straddling the under side of the portion 10 of the air chuck.

Diametrically opposite to the side of the chuck from which the arm 32 extends, the extension 29 of the member 28 is provided with a segmental slot 35 extending therethrough and communicating with the opening in the member for a purpose later to be explained.

The upwardly extending arm 36 of a spring clip member is secured adjacent its upper end, as indicated at 37, to the angularly disposed portion 33 of the arm 32 and normally extends from said arm downwardly in a direction substantially parallel to the portion 33, previously referred to, with the result that the lower portion of the arm 36 of the spring clip member is spaced from the L-shaped arm 32 adjacent the angle of the two portions of said arm. The spring clip member has a substantially oval-shaped portion 38 extending laterally from the arm 36 and lying against the outer side of the member 28. This oval-shaped portion 38 of the spring clip member is provided with a substantially oval-shaped opening 39 from the circumference of which is an inwardly extending portion 40 arranged to engage in the slot 35, in the extension 29 of the member 28 and provided at its inner edge with a segmental beveled thread engaging portion 41.

Figure 2:
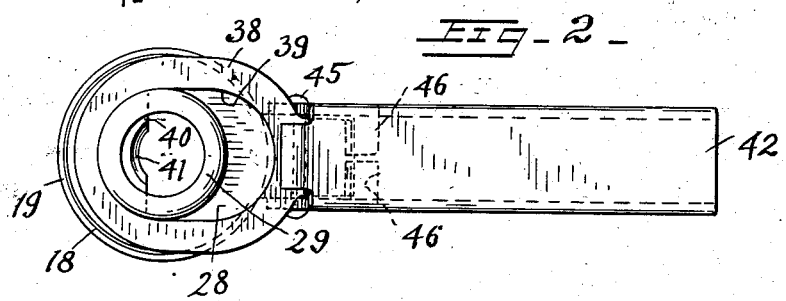
Fig. 2 is a bottom plan view of the air chuck disclosed in Fig. 1.
Figure 3:
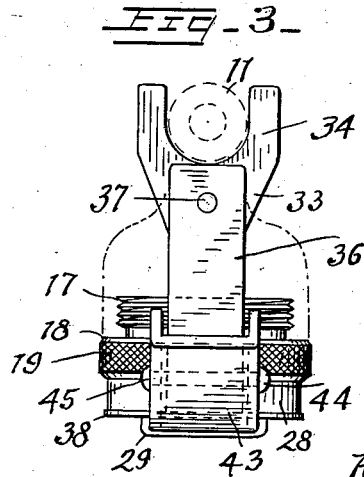
Fig. 3 is a side elevational view thereof taken from the right-hand side of Fig. 1.

The manner in which the spring clip is secured to the angular portion 33 of the L-shaped arm 32 is such that the tension of the spring normally maintains the segmental thread engaging portion 41 within the opening of the member 28 and in thread engaging position, as indicated in Fig. 2.

In order to overcome the tension of the spring clip 36 and move the portion 38 to cause the segmental thread engaging portion 41 of the projection 40 to slide outwardly in the slot 35 and out of thread engaging position, I provide a lever 42 which is substantially channel-shaped and has its sides 43 provided with extensions straddling the L-shaped arm 32 at the angle between the two arm portions, being pivoted to said arm by means of a pin 44.

The spring clip member 36 also extends into the lever 42 between the sides 43 thereof, the base 42 of the lever being provided with a lug 45 engaging the under side of the spring clip to limit springing movement of the lever in one direction. Just rearwardly of the upwardly extending arm of the spring clip 36 the sides 43 of the lever are provided with alined inturned tabs 46 extending inwardly of the lever to a point adjacent the center line thereof. It will be seen that when the lever 42 is swung upwardly toward the portion 10 of the chuck, that the tabs 46 will engage the upwardly extending arm of the spring clip member 36 and causes the oval portion 38 of said member to move toward the left, as viewed in the drawing, with the result that the segmental thread engaging portion 41 will be moved out of thread engaging position, it being noted that such movement of the portion 38 of the spring member is guided by the engagement of the projection 40 within the slot 35 of the member 28. Of course, as soon as the lever 42 is released it will be returned to its normal position by the spring clip and by gravity while the portion 38 of the spring clip will return to its normal position with the segmental thread engaging portion 41 in the position shown in Fig. 2.

In Fig. 1 the chuck is shown as positioned upon a valve stem, a fragmentary portion of the outer end of such stem being indicated at 47. It will be understood that the outer end of the valve stem, when the chuck is applied thereto, engages the outermost gasket 22 to form an air seal between the stem and chuck while the valve pin 48 of the usual valve insides arranged in said stem, engages the pin 27 of the chuck valve 25, and because of such engagement the valve of the valve insides, is unseated and the valve 25 of the chuck is also unseated to allow the air to flow through the chuck and valve stem and into the tire being inflated. The segmental thread engaging portion 41 of the spring clip engages the exterior threads 49 of the valve stem and holds the chuck in position upon such stem, it being noted that the engagement between the portion 41 and the threads 49 of the stem is on that side of the chuck opposite to the side thereof from which the air hose extends. This arrangement is of great importance in that it enables the chuck to be securely positioned and held upon the valve stem. If the segmental thread engaging portion 41 engaged the threads of the valve stem on the same side of the chuck as that from which the air hose extends, the weight of the air hose would cause the chuck to rock about the portion 41 as a fulcrum and thus destroy the desired airtight connection of the chuck with the end of the valve stem. With the segmental thread engaging portion 41, located as shown and described herein, it will be seen that the tendency of the chuck to tilt because of the weight of the air hose will be resisted by such thread engaging portion and such tendency will only cause the end of the valve stem to more tightly engage with the gasket 22. It should further be noted that the spring clip 36 is not flexed about any sharp corners and that therefore the life of the clip will be substantially indefinite.

Although a preferred embodiment of the invention has been illustrated and described herein, it should be understood that the invention is susceptible of various modifications and adaptations as fall within the scope of the appended claims.

Having thus described my invention, I claim:

1. In an air chuck, a member arranged at the valve stem engaging end of the chuck and provided with a stem receiving opening, said member having a substantially L-shaped arm the outer end of which is inclined inwardly toward the chuck, a spring clip having angularly disposed parts one of which is substantially parallel to the inclined outer end of said L-shaped arm and is secured thereto and the other of which is substantially parallel to the outer side of said member and is provided with a valve stem thread engaging portion normally positioned in the opening in said member, and means carried by said L-shaped arm for deflecting said spring clip.

2. In an air chuck, a member arranged at the valve stem engaging end of the chuck and provided with a stem receiving opening and having a slot extending laterally therefrom, said member having a substantially L-shaped arm extending laterally and upwardly of said chuck, the outer end of said arm being inclined inwardly toward the chuck, a spring clip having angularly disposed parts one of which is substantially parallel to the inclined outer end of said arm and is secured thereto and the other of which is substantially parallel to the outer side of said member and is provided with a valve stem thread engaging portion slidably arranged in said slot and normally extending into said opening, and means pivoted to said L-shaped arm and adapted to be engaged with the first mentioned clip part to deflect the clip and move said thread engaging portion thereof out of said opening.

3. In an air chuck, a member arranged at the valve stem engaging end of the chuck and provided with a stem receiving opening and a tubular extension surrounding the same at its outer end and having a transverse slot through a portion thereof, said member having a substantially L-shaped arm extending laterally and upwardly of said chuck, the outer end of said arm being inclined inwardly toward the chuck, a spring clip having angularly disposed parts, one of which is substantially parallel to the inclined outer end of said arm and is secured thereto and the other of which is substantially parallel to the outer side of said member, said last named part having an opening straddling the tubular extension of said member and provided with an inwardly extending valve stem thread engaging portion arranged in said transverse slot, and means carried by said L-shaped arm for deflecting said spring clip.

4. In an air chuck, a member arranged at the valve stem engaging end of the chuck and provided with a stem receiving opening and a tubular extension surrounding the same at its outer end and having a segmental transverse slot through a portion thereof, said member having a substantially L-shaped arm arranged at the diametrically opposite side of said extension to said slot and extending laterally and upwardly of the chuck, the outer end of said arm being inclined inwardly toward the chuck and provided with a fork adapted to straddle the air hose connecting portion of the chuck, a spring clip having angularly disposed parts, one of which is substantially parallel to the inclined outer end of said arm and is secured thereto and the other of which is substantially parallel to the outer side of said member, said last named part having an opening straddling the tubular extension of said member and provided with an inwardly extending valve stem thread engaging portion arranged in said transverse slot and normally extending into the opening in said member, and a lever pivotally connected to said arm and having a portion adapted to be engaged with the first named part of the spring clip to deflect it and move said thread engaging portion outwardly in said slot.

JOHN C. CROWLEY.